US012721465B2

(12) United States Patent
Wang

(10) Patent No.: US 12,721,465 B2
(45) Date of Patent: Sep. 1, 2026

(54) APPLIANCE COUPLER WATER PUMPING APPARATUS

(71) Applicant: BEIJING LEFT TREE TECHNOLOGY CO., LTD., Beijing (CN)

(72) Inventor: Hao Wang, Beijing (CN)

(73) Assignee: Beijing Left Tree Technology Co.LTD

( * ) Notice: Subject to any disclaimer, the term of this patent is extended or adjusted under 35 U.S.C. 154(b) by 822 days.

(21) Appl. No.: 18/245,775

(22) PCT Filed: Nov. 4, 2020

(86) PCT No.: PCT/CN2020/126583
§ 371 (c)(1),
(2) Date: Mar. 17, 2023

(87) PCT Pub. No.: WO2022/032895
PCT Pub. Date: Feb. 17, 2022

(65) Prior Publication Data

US 2023/0320515 A1 Oct. 12, 2023

(30) Foreign Application Priority Data

Sep. 22, 2020 (CN) ......................... 202011005079.9

(51) Int. Cl.
*A47J 27/21* (2006.01)
*F16K 1/14* (2006.01)

(52) U.S. Cl.
CPC ... *A47J 27/21166* (2013.01); *A47J 27/21008* (2013.01); *F16K 1/14* (2013.01)

(58) Field of Classification Search
CPC .. A47J 27/21166; A47J 27/21008; F16K 1/14
See application file for complete search history.

(56) References Cited

U.S. PATENT DOCUMENTS 8,033,212 B2 * 10/2011 Liu ......................... A47J 31/02 99/323
2017/0275063 A1 * 9/2017 Melzer .................. A47G 19/12

FOREIGN PATENT DOCUMENTS

CN 105147093 B 12/2017
CN 108577529 A 9/2018
(Continued)

OTHER PUBLICATIONS

CNIPA, International Search Report issued in IA No. PCT/CN2020/126583, dated Jun. 18, 2021.

*Primary Examiner* — Eric Keasel
(74) *Attorney, Agent, or Firm* — Ingrassia Fisher & Lorenz, LLP

(57) ABSTRACT

An appliance coupler water pumping apparatus, used in a liquid heater having a detachable inner container from a base body, is provided. The appliance coupler water pumping apparatus contains a water inlet pipe assembly communicating with an inner portion of the inner container by means of a first through hole and a water pumping pipe assembly being used for matching with the water inlet pipe assembly and extracting liquid in the inner container when communicating with the water inlet pipe assembly. According to the technical solution provided in the present disclosure, a user is able to enable the water inside the inner container of the kettle to flow out by means of the water inlet pipe assembly and the water pumping pipe assembly without lifting the kettle, thereby reducing cases of water spillage, avoiding the scalding for the children, elderly people and users with physical disabilities, and achieving high safety.

14 Claims, 4 Drawing Sheets

(56) References Cited

FOREIGN PATENT DOCUMENTS

| | | | |
|---|---|---|---|
| CN | 109247823 | A | 1/2019 |
| CN | 110043729 | A | 7/2019 |
| CN | 110897507 | A | 3/2020 |
| CN | 110934492 | A | 3/2020 |
| JP | 62294913 | A | 12/1987 |

* cited by examiner

APPLIANCE COUPLER WATER PUMPING APPARATUS

CROSS-REFERENCE TO RELATED APPLICATIONS

This application is a U.S. National-Stage entry under 35 U.S.C. § 371 based on International Application No. PCT/CN2020/126583, filed Nov. 4, 2020, which was published under PCT Article 21(2) and which claims priority to Chinese Application No. 202011005079.9, filed Sep. 22, 2020, which are all hereby incorporated in their entirety by reference.

FIELD

The present disclosure relates to an automatic pumping electric kettle, in particular to an appliance coupler water pumping apparatus.

BACKGROUND

In daily life, electric kettle is a necessary household appliance product in modern kitchen and living room due to its fast and convenient operation. It is suitable for brewing tea, boiling water, beverage, baby milk, etc. Traditional kettles require users to lift and tilt the kettles and pour water from the spout into the external water containers. In this process, users need to be highly concentrated, and slight carelessness may lead to water spillage, especially for children, elderly people and users with physical disabilities, which is easy to cause water spillage and potential safety hazards. The existing electric kettle with automatic water discharge function does not have the inner container separation function, and the way of filling water into the kettle and cleaning the inner container is complex, causing much inconvenience to users.

SUMMARY

The present disclosure aims to solve at least one of the technical problems existing in the prior art or related technology.

In order to achieve the above-mentioned purpose, the present disclosure provides an appliance coupler water pumping apparatus, which comprises: a water inlet pipe assembly, the water inlet pipe assembly is communicated with an inner portion of the inner container through the first through hole; and a water pumping pipe assembly, the water pumping pipe assembly is used to match with the water inlet pipe assembly and extract the liquid in the inner container when it is communicated with the water inlet pipe assembly.

Further, the water inlet pipe assembly comprises a water inlet pipe and a water sealing sliding block; an end of the water inlet pipe facing the inner container is communicated with the inner portion of the inner container; the water sealing sliding block is slidably arranged in the water inlet pipe to seal an end of the water inlet pipe away from the inner container; preferably, the water inlet pipe assembly further comprises a first sealing sleeve, the first sealing sleeve is arranged at the end of the water inlet pipe away from the inner container, and the first sealing sleeve is embedded in the water inlet pipe; the first sealing sleeve is provided with a second through hole along an axis of the water inlet pipe, and an end of the second through hole facing the water sealing sliding block forms a sealing groove matching with the water sealing sliding block.

Further, an end of the water sealing sliding block facing the first sealing sleeve is fixedly provided with a sealing ball; the sealing groove of the second through hole is a spherical surface groove matched with the spherical surface of the sealing ball; preferably, the sealing ball is a stainless-steel ball.

Further, an inner wall and an outer wall of the end of the water inlet pipe close to the inner container extend radially along the water inlet pipe to form a first supporting part and a second supporting part respectively; a spring is arranged between the first supporting part and the second supporting part. One end of the spring abuts against the first supporting part, and another end thereof abuts against the water sealing sliding block.

Further, the water inlet pipe assembly further comprises a second sealing sleeve, the second sealing sleeve is annular-shaped, an outer wall surface of the second sealing sleeve abuts against an inner wall of the first through hole, and an inner wall surface of the second sealing sleeve abuts against the outer wall of the water inlet pipe; both two ends of the second sealing sleeve bulge along a radial direction of the water inlet pipe to form the first sealing part and the second sealing part in annular-shaped respectively; the inner container is clamped between the first sealing part and the second sealing part, and two sides of the second sealing part along anaxial direction of the water inlet pipe respectively abut against the bottom of the inner container and the second supporting part.

Further, the water pumping pipe assembly comprises: a water pumping pipe, an end of the water pumping pipe facing the inner container is provided with a push rod, the push rod is used to push the sealing ball through the second through hole to forma gap between the sealing ball and the sealing groove; preferably, the water pumping pipe assembly further comprises a caliper. An outer wall of the water pumping pipe bulges to form an annular step structure along a radial direction of the water pumping pipe, and the outer wall of the water pumping pipe is further provided with an annular clamp groove; the caliper is detachably sleeved in the annular clamp groove, and used to fix the water pumping pipe on an appliance input socket.

Further, the water sealing sliding block comprises a connecting part and a plurality of sliding parts arranged on side surface of the connecting part, and the water sealing sliding block sliding contacts with the inner wall of the water inlet pipe through the plurality of sliding parts; preferably, a water leakage gap is provided between any two adjacent sliding parts. One side of the connecting part facing the inner container abuts against the spring, and another side is fixedly connected with the sealing ball.

Further, the second through hole is provided with an annular-shaped convex structure protruding from an inner wall of the second through hole along the radial direction of the water inlet pipe. An inner diameter of the convex structure is smaller than an outer diameter of the water pumping pipe, the convex structure is used to generate deformation when the water pumping pipe is inserted into the second through hole and fit with the outer wall of the water pumping pipe; the convex structure smoothly transitions with the inner wall of the second through hole; preferably, the convex structure is one or more.

Further, the water pumping pipe assembly further comprises a water outlet pipe and a third sealing sleeve, the end of the water pumping pipe far away from the inner container extends into the water outlet pipe, and the water pumping pipe is sealed and connected with the water outlet pipe through the third sealing sleeve; the third sealing sleeve comprises a tubular-shaped sealing connection part and a water outlet part arranged at a lower end of the sealing connection part. The water outlet part comprises two oppositely arranged water outlet wall surfaces. A distance between the two water outlet wall surfaces gradually decreases along a water outlet direction, and a gap-shaped water outlet is formed at an end portion of the water outlet part; preferably, the water pumping pipe assembly further comprises a water extraction pump arranged on the water outlet pipe.

Further, the appliance coupler pumping apparatus further comprises a water leakage cap, the water leakage cap is a tubular-shaped metal piece with a water leakage hole at one end; the water leakage cap is arranged outside the water inlet pipe, and the inner wall surface of the second sealing sleeve is fit with the outer wall surface of the water leakage cap.

The advantages of the technical solution provided by the embodiments of the present disclosure is that the appliance coupler water pumping apparatus used in the liquid heater having a detachable inner container provided by the present disclosure comprises the water inlet pipe and the water pumping pipe correspondingly arranged on the connector. After the heater completes heating the water in the inner container, the user is able to enable the water in the inner container to flow out through the water inlet pipe assembly and the water pumping pipe assembly without lifting the kettle. It reduces the cases of water spillage, and avoids scalding for the children, elderly people and users with physical disabilities, and achieves high safety. When the inner container is taken out, the appliance input socket is separated from the connector, the water path is disconnected, and it is convenient for water collecting and cleaning.

BRIEF DESCRIPTION OF THE DRAWINGS

The present invention will hereinafter be described in conjunction with the following drawing figures, wherein like numerals denote like elements, and.

Figure 1:
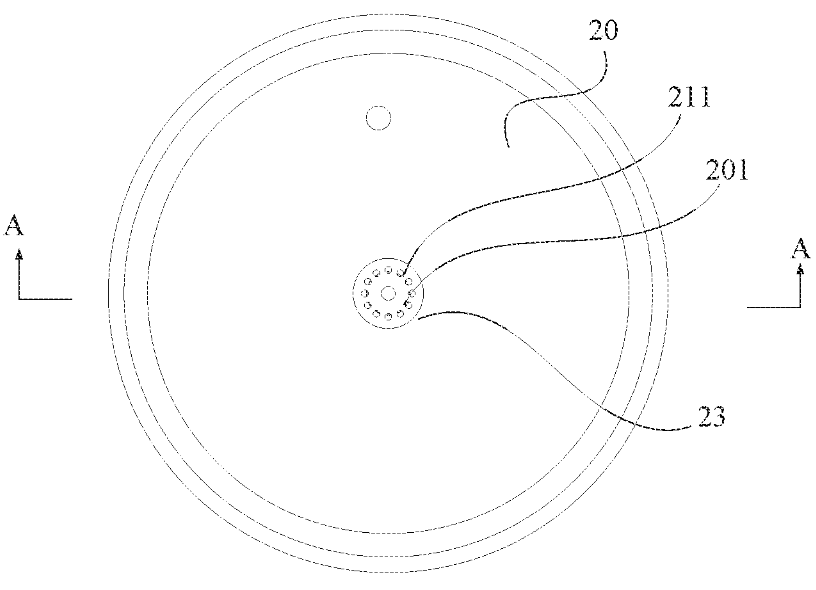
FIG. 1 shows atop view of the appliance coupler water pumping apparatus in one embodiment of the present disclosure.

The reference numerals in figures are described as follows:

1 connector, 2 appliance input socket, 21 installation part, 20 inner container, 22 heating plate, 201 water leakage cap, 211 water leakage hole, 23 first through hole, 3 water inlet pipe, 31 first supporting part, 32 second supporting part, 4 spring, 5 water sealing sliding block, 51 connection part, 52 sliding part, 53 sealing ball, 6 first sealing sleeve, 61 second through hole, 611 sealing groove, 612 convex structure, 7 second sealing sleeve, 71 first sealing part, 72 second sealing part, 8 water outlet pipe, 81 third sealing sleeve, 811 sealing connection part, 812 water outlet part, 8121 water outlet wall surface, 8122 water outlet, 9 water pumping pipe, 91 step structure, 911 first step, 912 second step, 92 annular-shaped clamp groove, 93 caliper, 94 push rod, 941 connecting plate, 942 top plate.

DETAILED DESCRIPTION OF THE PRESENT DISCLOSURE

In order to make the purposes, technical solutions and advantages of the present disclosure clearer, the embodiments and beneficial effects of the present disclosure will be further described in detail in combination with the attached drawings.

The water pumping apparatus of the automatic water pumping kettle is an important component that flows liquid directly from the bottom of the kettle to the spout through the conduit in the middle of the appliance coupler. This apparatus has an anti-backflow mechanism. When the inner container is lifted, it can separate the inner container from the water pumping assembly on the base. The liquid of the inner container will not leak out from the bottom, which is convenient for cleaning the kettle body separately or collecting water directly.

Figure 2:
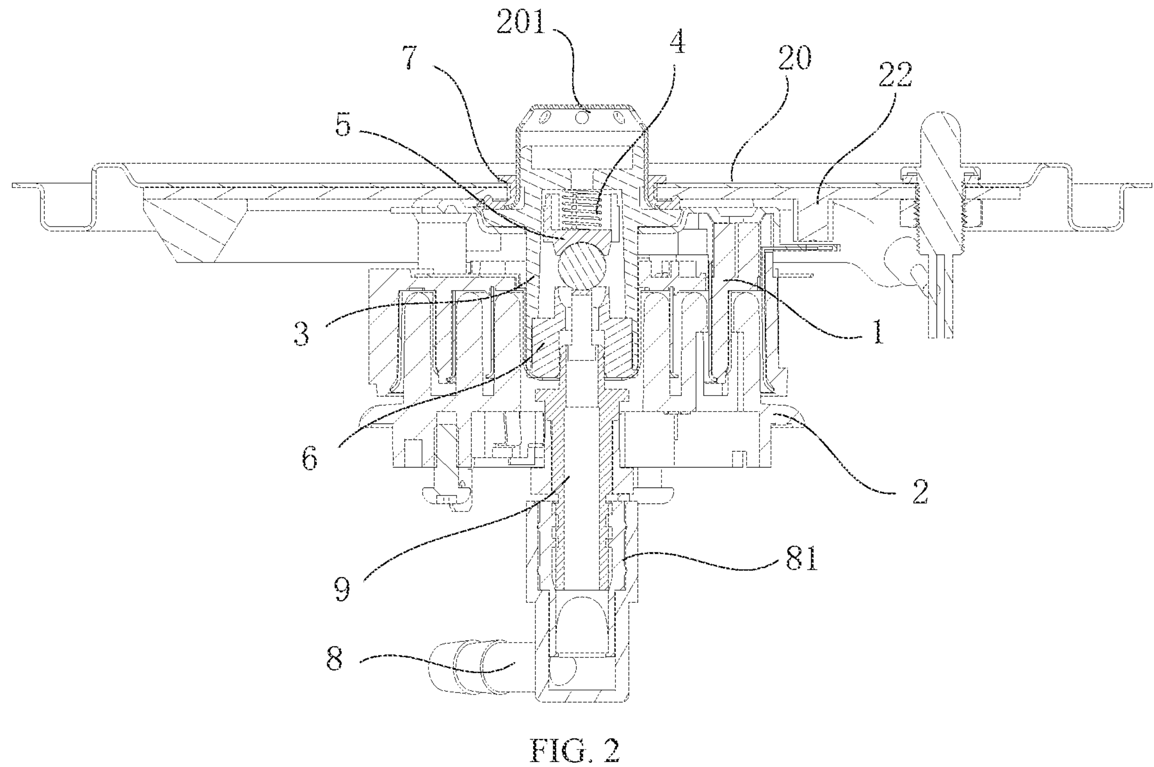
FIG. 2 shows a sectional structure schematic diagram of part A-A in FIG. 1.

As shown in FIGS. 1 and 2, an embodiment of the present disclosure provides an appliance coupler water pumping apparatus, which is an important component using for the liquid heater having the detachable inner container to flow liquid directly from the bottom of the kettle to the spout and so on, and to guide the water out from the kettle.

The bottom of the inner container 20 is provided with a first through hole 23, and the bottom of the inner container 20 is provided with a heating plate 22. The first through hole 23 is used to make the water in the inner container 20 flow out through the first through hole 23 arranged at the bottom of the inner container 20, and the heating plate 22 is used to heat the water in the inner container 20.

The appliance coupler water pumping apparatus comprises a connector 1, and an appliance input socket 2, the connector 1 is fixedly connected with the heating plate 22, the central position of connector 1 is provided with a water inlet pipe assembly, the appliance input socket 2 is inserted and matched with the connector 1, and the central position of the appliance input socket is provided with a water pumping pipe assembly; specifically, the connector 1 is fixed to the heating plate 22 by several bolts; the central position of the connector 1 is provided with a circular hole. The water inlet pipe assembly is arranged in the circular hole of the connector 1. The end of the water inlet pipe assembly close to the inner container 20 extends into the first through hole 23 to connect with the inner portion of the inner container 20, so that the liquid in the inner container 20 can flow into the water inlet pipe assembly. The central position of the appliance input socket 2 is provided with a circular hole through the appliance input socket 2. The water pumping pipe assembly is arranged in the circular hole of the appliance input socket 2 and penetrates through the circular hole. The appliance input socket 2 is inserted and matched with the connector 1, that is, when the kettle in the liquid heater having the detachable inner container 20 is placed on the connector 1, the appliance input socket 2 is inserted and connected with the connector 1. When the inner container 20 is placed in the base, one end of the water pumping pipe assembly is inserted into the water inlet channel to communicated with the water inlet pipe assembly, so that the water path is communicated, the liquid in the inner container 20 flows out through the water inlet channel and the water pumping pipe assembly in turn; compared with the traditional kettles need users to lift the kettle and tilt it to pour the water from the spout into the external water container, in the technical solution of the present disclosure, after the heater completes heating the water in the inner container 20, the users do not need to lift the kettle, that is, they can make the water in the inner container 20 flow out through the water inlet pipe assembly and the water extraction assembly to reduce the occurrence of water spillage, and avoid scalding for the children, elderly people and users with physical disabilities, and achieving high safety. When the inner container is taken out, the appliance input socket 2 is separated from the connector 1, the water path is disconnected, and it is convenient for water collecting and cleaning.

Figure 3:
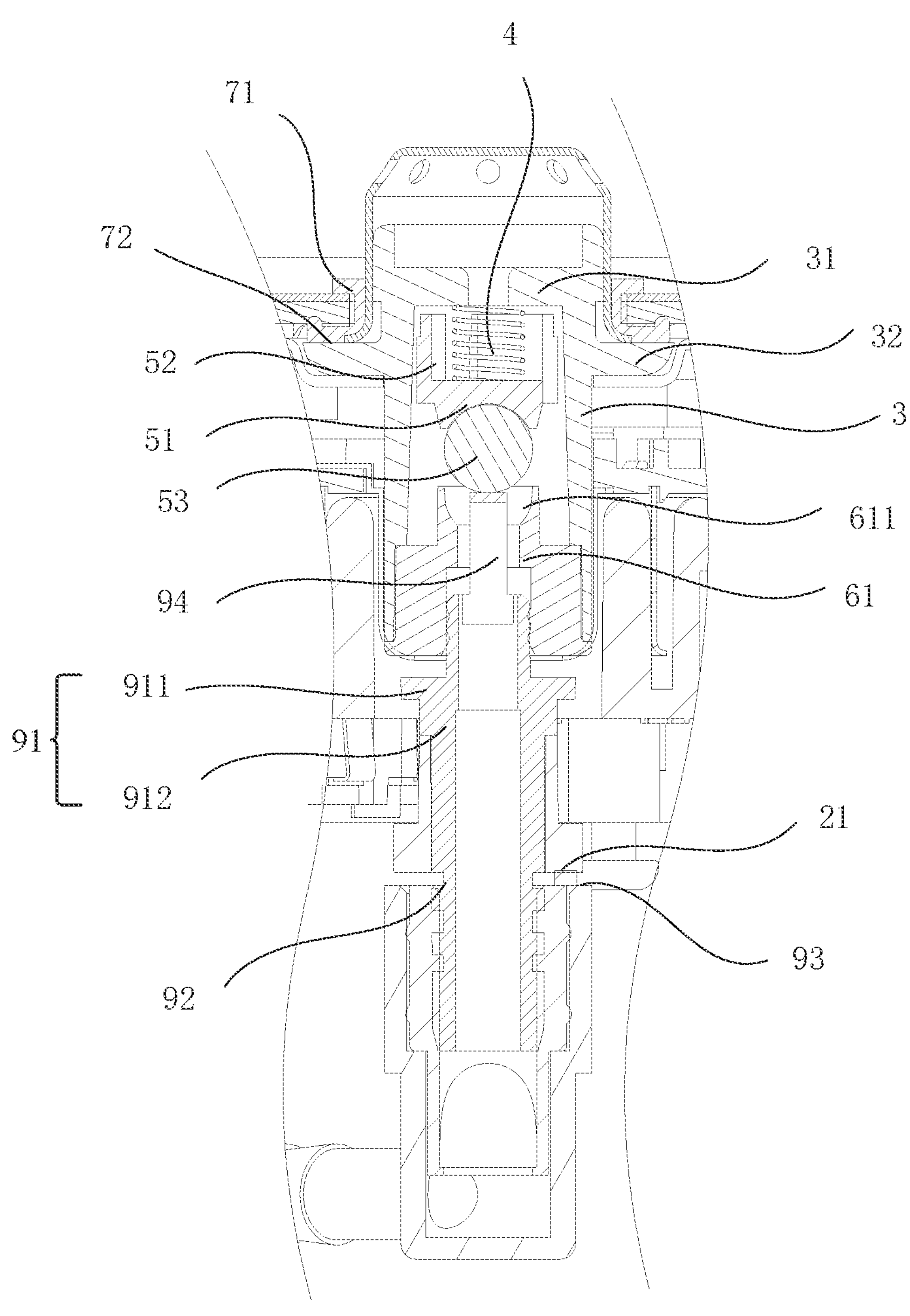
FIG. 3 shows a partial schematic diagram in FIG. 2.
Figure 6:
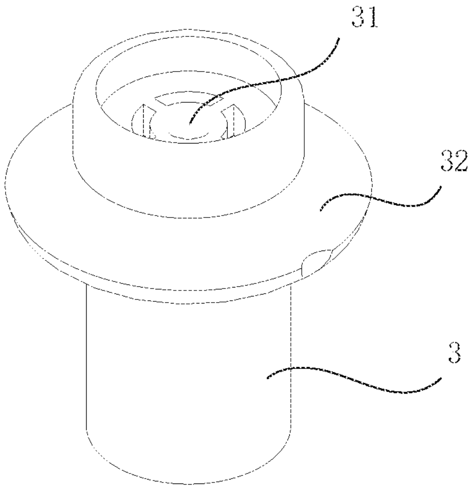
FIG. 6 shows a sectional structure schematic diagram of a water inlet pipe of one embodiment of the present disclosure.

Further, as shown in FIGS. 2 and 3, the water inlet pipe assembly comprises: a water inlet pipe 3, a water sealing sliding block 5, a first sealing sleeve 6, a second sealing sleeve 7, and a spring 4. Specifically, as shown in FIG. 6, the end of the water inlet pipe 3 facing the inner container 20 is communicated with the inner portion of the inner container 20, and the inner wall and the outer wall of the end of the water inlet pipe 3 close to the inner container 20 extend along the radial direction of the water inlet pipe 3 to form the first supporting part 31 and the second supporting part 32. The water sealing sliding block 5 is slidably arranged in the water inlet pipe 3, and the first sealing sleeve 6 is embedded in the water inlet pipe 3, and the first sealing sleeve 6 is located at the end of the water inlet pipe 3 away from the inner container 20, the first sealing sleeve 6 is provided with a second through hole 61 along the axis of the water inlet pipe 3, and the end of the second through hole 61 facing the water sealing sliding block 5 forms a sealing groove 611 matching with the water sealing sliding block 5, the end of the water sealing sliding block 5 facing the first sealing sleeve 6 is fixedly provided with a sealing ball 53, the sealing groove 611 of the second through hole 61 is a spherical surface groove matched with the spherical surface of the sealing ball 53, one end of the spring abuts against the first supporting part 31, and another end abuts against the water sealing sliding block 5. Specifically, when the connector 1 and the appliance input socket 2 are separated, the first supporting part 31 is used to provide support for the spring 4. On the one hand, it defines the position of the spring 4, and on the other hand, it provides supporting force for the spring 4. Under the gravity of the sealing ball 53 and the pushing effect of the spring 4, the water sealing sliding block 5 moves towards the first sealing sleeve 6, making the sealing ball 53 abut against the sealing groove 611, so as to block off the second through hole 61, and to prevent water in the inner container 20 from leaking out through the water inlet assembly when the inner container 20 is separated from the base.

As shown in FIG. 6, the first supporting part 31 is provided with four through holes, so that the water in the inner container flows into the water inlet pipe 3 through the through holes.

The sealing ball 53 is arranged as a sphere-shaped, and the sealing groove 611 is also arranged as a groove of the spherical surface, so that the sealing ball 53 has a large contact area when it abuts against the sealing groove 611, which improves the leak proofness.

The sealing ball 53 is a stainless-steel ball. On the one hand, the material density of the stainless steel ball is high, the gravity of the stainless steel ball adds to the downward force of the spring 4, so that the water sealing effect between the sealing ball 53 and the sealing groove 611 better; on the other hand, the spherical surface of the stainless steel ball is smooth, the first sealing groove 611 is made of rubber or silica gel and other materials with good elasticity, which makes the stainless steel ball and the sealing groove 611 fit more closely, and the stainless steel ball is safe and rust-free.

The second sealing sleeve 7 is annular-shaped, the outer wall surface of the second sealing sleeve 7 abuts against the inner wall of the first through hole 23, and the inner wall surface of the second sealing sleeve 7 abuts against the outer wall of the water inlet pipe 3, so as to seal the connection position of the water inlet pipe 3 and the inner container 20, and prevent the leakage of the liquid in the inner container 20 from the gap between the first through hole 23 and the wall of water inlet pipe 3.

Further, as shown in FIG. 3, both two ends of the second sealing sleeve 7 bulge along the radial direction of the water inlet pipe 3 to form the first sealing part 71 and the second sealing part 72 in annular-shaped respectively; the inner container 20 is clamped between the first sealing part 71 and the second sealing part 72, and two sides of the second sealing part 72 along the axial direction of the water inlet pipe 3 respectively abut against the bottom of the inner container 20 and the second supporting part 32, so as to further improve the leak proofness of the connection between the water inlet pipe 3 and the inner container 20, specifically, the heating plate 22 is also provided with an annular groove, and the second sealing part 72 is provided with an annular protrusion corresponding to the annular groove, the annular protrusion extends into the annular groove to improve the leak proofness of the second sealing sleeve 7.

Figure 5:
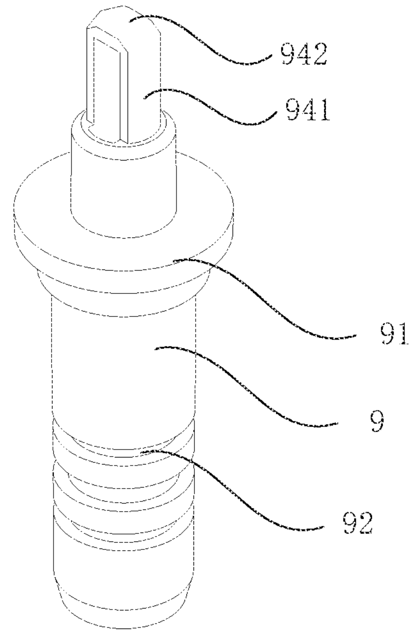
FIG. 5 shows a sectional structure schematic diagram of a water pumping pipe in one embodiment of the present disclosure.

As shown in FIG. 3, the water pumping pipe assembly specifically comprises a water pumping pipe 9, a water outlet pipe 8, a third sealing sleeve 81, and a caliper 93. As shown in FIG. 5, the outer wall of the water pumping pipe bulges to form an annular step structure 91 along the radial direction of the water pumping pipe 9, the step structure 91 comprises a first step 911 and a second step 912, an annular clamp groove 92 is provided along the radial direction of the water pumping pipe 9, the caliper 93 is clamped and connected with the annular clamp groove 92, the caliper 93 is detachably connected in the annular clamp groove 92. The appliance input socket 2 is provided with an installation part 21 matched with the water pumping pipe 9. The second step 912 and the caliper 93 respectively abuts against the two sides of the installation part 21, so as to limit the movement of the water pumping pipe 9 relative to the appliance input socket 2 through the cooperation of the second step 912, the caliper 93 and the installation part 21, so as to fix the water pumping pipe 9 on the appliance input socket 2; wherein the end of the water pumping pipe 9 facing the inner container 20 is provided with a push rod 94. When the connector 1 is inserted and connected with the appliance input socket 2, the water pumping pipe 9 is inserted into the first through hole 23 to communicated with the water inlet pipe 3, and the push rod 94 passes through the second through hole 61 to push the sealing ball 53, so as to forma gap between the sealing ball 53 and the sealing groove 611, so that the water in the inner container 20 flows into the water pumping pipe 9 through the gap between the water inlet pipe 3, the sealing ball 53 and the sealing groove 611, so as to realize the discharge of the water outwards the inner container 20.

As shown in FIG. 5, the push rod 94 comprises two connecting plates 941 arranged at intervals and connected with the water pumping pipe and a top plate 942 connected with the two connecting plates. The purpose of two connecting plates 941 arranged at intervals is to enable the water in the water inlet pipe 3 to flow into the water pumping pipe 9 through the interval between the two connecting plates 941.

Figure 4:
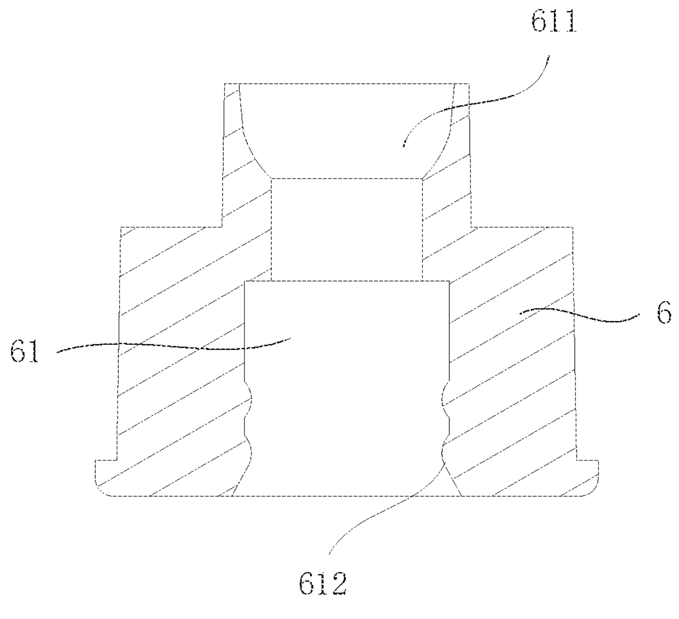
FIG. 4 shows a sectional structure schematic diagram of a first sealing sleeve.

Further, as shown in FIGS. 3 and 4, the second through hole 61 is provided with at least two annular-shaped convex structures 612 protruding from the inner wall of the second through hole 61 along the radial direction of the water inlet pipe 3. The inner diameter of the convex structure 612 is smaller than the outer diameter of the water pumping pipe 9. When the water pumping pipe 9 is inserted into the second through hole 61, because the inner diameter of the convex structure 612 is smaller than the outer diameter of the water pumping pipe 9, the convex structure 612 is squeezed, causing the convex structure 612 to generate deformation and fit with the outer wall of the water pumping pipe 9, therefore, an annular sealing area is formed between the convex structure 612 and the water pumping pipe 9, so as to improve the leak proofness between the water pumping pipe 9 and the water inlet pipe 3, and avoid the leakage of liquid from the connection gap between the water pumping pipe 9 and the water inlet pipe 3.

Further, as shown in FIG. 4, the convex structure 612 smoothly transits with the inner wall of the second through hole 61 to reduce the resistance when the water pumping pipe 9 is inserted into the second through hole 61.

Specifically, the convex structures 612 on the second through hole 61 can be arranged as 2, 3 or 4 in quantity, etc. By setting a plurality of convex structures 612, a plurality of annular sealing areas are formed between the second sealing sleeve 7 and the water pumping pipe 9 to improve the sealing performance.

Figure 7:
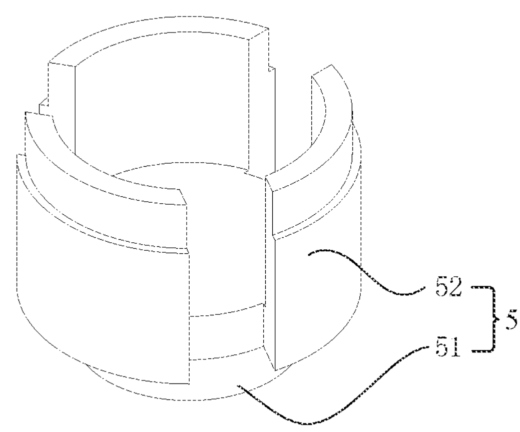
FIG. 7 shows a structural schematic diagram of a water sealing sliding block in one embodiment of the present disclosure.

Further, as shown in FIG. 7, the water sealing sliding block 5 comprises a connecting part and a plurality of sliding parts 52 arranged on the side surface of the connecting part 51, and the water sealing sliding block 5 sliding contacts with the inner wall of the water inlet pipe 3 through the plurality of sliding parts 52. The purpose of setting a plurality of sliding parts 52 is to limit the position of the spring 4, so that the spring 4 is always located between a plurality of sliding parts 52 and abuts against the connecting part 51 under the state transition between expansion and contraction.

Wherein, a water leakage gap is provided between any two adjacent sliding parts 52, so that the water in one end of the water inlet pipe 3 flows from the water leakage gap to another end of the water inlet pipe 3. Specifically, one side of the connecting part 51 facing the inner container 20 abuts against the spring 4, and another side fixedly connects with the sealing ball 53.

Further, as shown in FIGS. 3 and 5, the water pumping pipe assembly further comprises a water outlet pipe 8, a third sealing sleeve 81, and a water extraction pump. The end of the water pumping pipe 9 far away from the inner container 20 extends into the water outlet pipe 8, and the water pumping pipe 9 is sealed and connected with the water outlet pipe 8 through the third sealing sleeve 81. The water extraction pump is arranged on the water outlet pipe 8; wherein when the connector 1 is connected with the appliance input socket 2, and when the water extraction pump is turned on, the water extraction pump pumps water, and the water in the water pumping pipe 9 flows in the direction to the water outlet pipe 8. Since the water extraction pump 9 is communicated with the water inlet pipe 3, negative pressure is generated in the water inlet pipe 3, and the liquid in the inner container 20 flows out.

Figure 8:
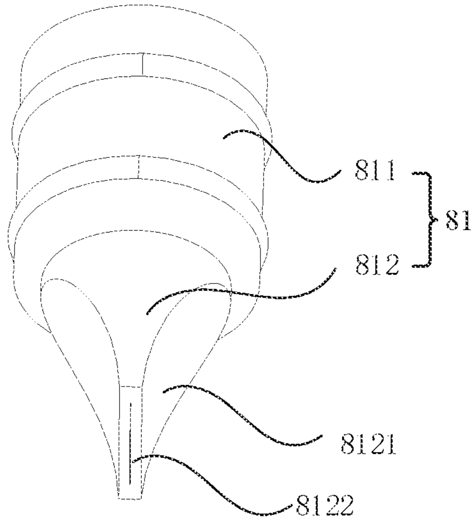
FIG. 8 shows a structural schematic diagram of a third sealing sleeve of one embodiment of the present disclosure.

As shown in FIG. 8, the third sealing sleeve 81 comprises a tubular-shaped sealing connection part 811 and a water outlet part 812 arranged at the lower end of the sealing connection part. The water outlet part 812 comprises two oppositely arranged water outlet wall surfaces 8121. The distance between the two water outlet wall surfaces 8121 gradually decreases along the water outlet direction, and a gap-shaped water outlet 8122 is formed at an end portion of the water outlet part 812 to prevent the water in the water outlet pipe 8 from flowing back into the water pumping pipe 9.

The first sealing sleeve 6, the second sealing sleeve 7 and the third sealing sleeve 81 are made of rubber material. The rubber sealing sleeves are made of rubber material, so they have the characteristics of sealing, anti-skid and elasticity.

In a specific embodiment, a clamp groove is arranged in the circular hole of the connector 1, and the outer wall of the water inlet pipe 3 is provided with a convex-shaped buckle corresponding to the clamp groove in the circular hole of the connector 1, so as to realize the clipping connection between the water inlet pipe 3 and the connector 1 through the coordination of the buckle and the clamp groove.

A clamp groove is arranged in the circular hole of the appliance input socket 2, and the outer wall of the water pumping pipe 9 is provided with a convex-shaped buckle corresponding to the clamp groove in the circular hole of the appliance input socket 2, so as to realize the clipping connection between the appliance input socket 2 and the water pumping pipe 9 through the coordination of the buckle and the clamp groove.

As shown in FIGS. 1 and 2, the appliance coupler water pumping apparatus further comprises a water leakage cap 201, the water leakage cap 201 is a tubular-shaped metal piece with a water leakage hole 211 at one end; the water leakage cap 201 is sleeved outside the water inlet pipe 3, and the inner wall surface of the second sealing sleeve 7 is fit with the outer wall surface of the water leakage cap 201. By setting the water leakage cap 201, on the one hand, the bottom of the inner container 20 is more beautiful; on the other hand, by setting a number of water leakage holes 211, the large pieces of limescale or solid particles at the bottom of the inner container 20 can be prevented from flowing into the water inlet pipe 3 or the water pumping pipe 9 with the liquid to cause blockage.

Alternatively, a plurality of leakage holes 211 on the water leakage cap 201 are densely arranged so that the water leakage cap 201 is in a mesh grid shape.

The beneficial effects of the present disclosure are as follows: the appliance coupler water pumping apparatus used in the liquid heater having a detachable inner container provided by the present disclosure comprises the water inlet pipe and the water pumping pipe correspondingly arranged on the connector. During operation, the water inlet pipe is inserted into the inner container. After the heater completes heating the water in the inner container, the user is able to enable the water in the inner container to flow out through the water inlet pipe assembly and the water pumping pipe assembly without lifting the kettle. It reduces the cases of water spillage, and avoids scalding for the children, elderly people and users with physical disabilities, and achieves high safety. When the kettle is taken out, the appliance input socket is separated from the connector, the water path is disconnected.

In the present disclosure, "connection" can be fixed connection, removable connection or integrated connection; "connected" can be directly connected or indirectly connected through intermediate media. For those skilled in the art, the specific meaning of the above terms in the present disclosure can be understood according to the specific situation. The orientation or position relationship indicated by the terms "up", "down", "left", "right", "front", "rear", etc. is based on the orientation or position relationship shown in the attached drawings and cannot be understood as a limitation of the present disclosure.

The above is only the preferred embodiments of the present disclosure and is not intended to limit the present disclosure. For those skilled in the art, the present disclosure can have various revises and changes. Any modification, substitution to same object, improvement, etc. made within the spirit and principle of the present disclosure shall be included in the protection scope of the present disclosure.

I claim:

1. An appliance coupler water pumping apparatus, used for a liquid heater having a detachable inner container, a bottom of the inner container is provided with a first through hole, wherein the appliance coupler water pumping apparatus comprises a water inlet pipe assembly and a water pumping pipe assembly, the water inlet pipe assembly is communicated with an inner portion of the inner container through the first through hole; the water pumping pipe assembly is used to match with the water inlet pipe assembly and extract the liquid in the inner container when it is communicated with the water inlet pipe assembly;

the water inlet pipe assembly comprises a water inlet pipe and a water sealing sliding block; an end of the water inlet pipe facing the inner container is communicated with the inner portion of the inner container; the water sealing sliding block is slidably arranged in the water inlet pipe to seal an end of the water inlet pipe away from the inner container;

an inner wall and an outer wall of the end of the water inlet pipe close to the inner container extend radially along the water inlet pipe to form a first supporting part and a second supporting part respectively: a spring is arranged between the first supporting part and the second supporting part: one end of the spring abuts against the first supporting part, and another end thereof abuts against the water sealing sliding block.

2. The appliance coupler pumping apparatus according to claim 1, wherein the water inlet pipe assembly further comprises a first sealing sleeve, the first sealing sleeve is arranged at the end of the water inlet pipe away from the inner container, and the first sealing sleeve is embedded in the water inlet pipe; the first sealing sleeve is provided with a second through hole along an axis of the water inlet pipe, and an end of the second through hole facing the water sealing sliding block forms a sealing groove matching with the water sealing sliding block.

3. The appliance coupler pumping apparatus according to claim 2, wherein an end of the water sealing sliding block facing the first sealing sleeve is fixedly provided with a sealing ball; the sealing groove of the second through hole is a spherical surface groove matched with the spherical surface of the sealing ball.

4. The appliance coupler pumping apparatus according to claim 3, wherein the sealing ball is a stainless-steel ball.

5. The appliance coupler pumping apparatus according to claim 3, wherein the water pumping pipe assembly comprises a water pumping pipe, an end of the water pumping pipe facing the inner container is provided with a push rod, the push rod is used to push the sealing ball through the second through hole to form a gap between the sealing ball and the sealing groove.

6. The appliance coupler pumping apparatus according to claim 5, wherein the water pumping pipe assembly further comprises a caliper, an outer wall of the water pumping pipe bulges to form an annular step structure along a radial direction of the water pumping pipe, and the outer wall of the water pumping pipe is further provided with an annular clamp groove; the caliper is detachably sleeved in the annular clamp groove, and used to fix the water pumping pipe on an appliance input socket.

7. The appliance coupler pumping apparatus according to claim 5, wherein the second through hole is provided with an annular-shaped convex structure protruding from an inner wall of the second through hole along the radial direction of the water inlet pipe, an inner diameter of the convex structure is smaller than an outer diameter of the water pumping pipe, the convex structure is used to generate deformation when the water pumping pipe is inserted into the second through hole and fit with the outer wall of the water pumping pipe; the convex structure smoothly transitions with the inner wall of the second through hole.

8. The appliance coupler pumping apparatus according to claim 7, wherein the convex structure is one or more.

9. The appliance coupler pumping apparatus according to claim 5, wherein the water pumping pipe assembly further comprises a water outlet pipe and a third sealing sleeve; the end of the water pumping pipe far away from the inner container extends into the water outlet pipe, and the water pumping pipe is sealed and connected with the water outlet pipe through the third sealing sleeve; the third sealing sleeve comprises a tubular-shaped sealing connection part and a water outlet part arranged at a lower end of the sealing connection part, the water outlet part comprises two oppositely arranged water outlet wall surfaces, a distance between the two water outlet wall surfaces gradually decreases along a water outlet direction, and a gap-shaped water outlet is formed at an end portion of the water outlet part.

10. The appliance coupler pumping apparatus according to claim 9, wherein the water pumping pipe assembly further comprises a water extraction pump arranged on the water outlet pipe.

11. The appliance coupler pumping apparatus according to claim 3, wherein the water sealing sliding block comprises a connecting part and a plurality of sliding parts arranged on side surface of the connecting part, and the water sealing sliding block sliding contacts with the inner wall of the water inlet pipe through the plurality of sliding parts.

12. The appliance coupler pumping apparatus according to claim 11, wherein a water leakage gap is provided between any two adjacent sliding parts, one side of the connecting part facing the inner container abuts against the spring, and another side thereof is fixedly connected with the sealing ball.

13. The appliance coupler pumping apparatus according to claim 1, wherein the water inlet pipe assembly further comprises a second sealing sleeve, the second sealing sleeve is annular-shaped, an outer wall surface of the second sealing sleeve abuts against an inner wall of the first through hole, and an inner wall surface of the second sealing sleeve abuts against the outer wall of the water inlet pipe; two ends of the second sealing sleeve bulge along a radial direction of the water inlet pipe to form the first sealing part and the second sealing part in annular-shaped respectively; the inner container is clamped between the first sealing part and the second sealing part, and two sides of the second sealing part along an axial direction of the water inlet pipe respectively abut against the bottom of the inner container and the second supporting part.

14. The appliance coupler pumping apparatus according to claim 13, wherein the appliance coupler pumping apparatus further comprises a water leakage cap, the water leakage cap is a tubular-shaped metal piece with a water leakage hole at one end; the water leakage cap is arranged outside the water inlet pipe, and the inner wall surface of the second sealing sleeve is fit with the outer wall surface of the water leakage cap.

* * * * *